United States Patent

Shutt

[15] 3,677,606
[45] July 18, 1972

[54] METERING VALVE

[72] Inventor: Paul B. Shutt, St. Joseph, Mich.

[73] Assignee: The Bendix Corporation

[22] Filed: Aug. 5, 1970

[21] Appl. No.: 62,237

[52] U.S. Cl. ..........................................303/6 C, 60/54.6 E
[51] Int. Cl. ..........................................B60t 8/26
[58] Field of Search ..............................60/54.6 E; 303/6 C

[56] References Cited

UNITED STATES PATENTS

| | | | |
|---|---|---|---|
| 3,308,620 | 3/1967 | Melinat | 303/6 C X |
| 3,447,836 | 6/1969 | Doerfler | 303/6 C |
| 3,462,200 | 8/1969 | Lewis et al. | 303/6 C |
| 3,473,849 | 10/1969 | Smith et al. | 303/6 C |
| 3,499,688 | 3/1970 | Reynolds | 303/6 C |
| 3,526,437 | 9/1970 | Lewis | 303/6 C |
| 3,547,498 | 12/1970 | Bueler | 303/6 C |

*Primary Examiner*—Duane A. Reger
*Attorney*—Ken C. Decker and Plante, Hartz, Smith and Thompson

[57] ABSTRACT

A metering valve is provided that is installed in the outlet passage of a master cylinder. The outlet passage has a smaller diameter inlet chamber and a larger diameter outlet chamber with a shoulder therebetween. Valve means located in the outlet passage include a first valve member normally urged into engagement with the shoulder and a second valve member is normally urged away from the first valve member to permit fluid communication through the passage. When the pressure in the passage reaches a first predetermined level, the second valve member is driven into sealing engagement with the first valve member to prevent fluid communication through the passage. The first valve member is driven away from the shoulder to resume fluid communication through the passage when the pressure in the inlet chamber reaches a second predetermined level higher than said first predetermined level.

7 Claims, 3 Drawing Figures

Patented July 18, 1972

INVENTOR.
PAUL B. SHUTT
BY Ken C. Decker
ATTORNEYS

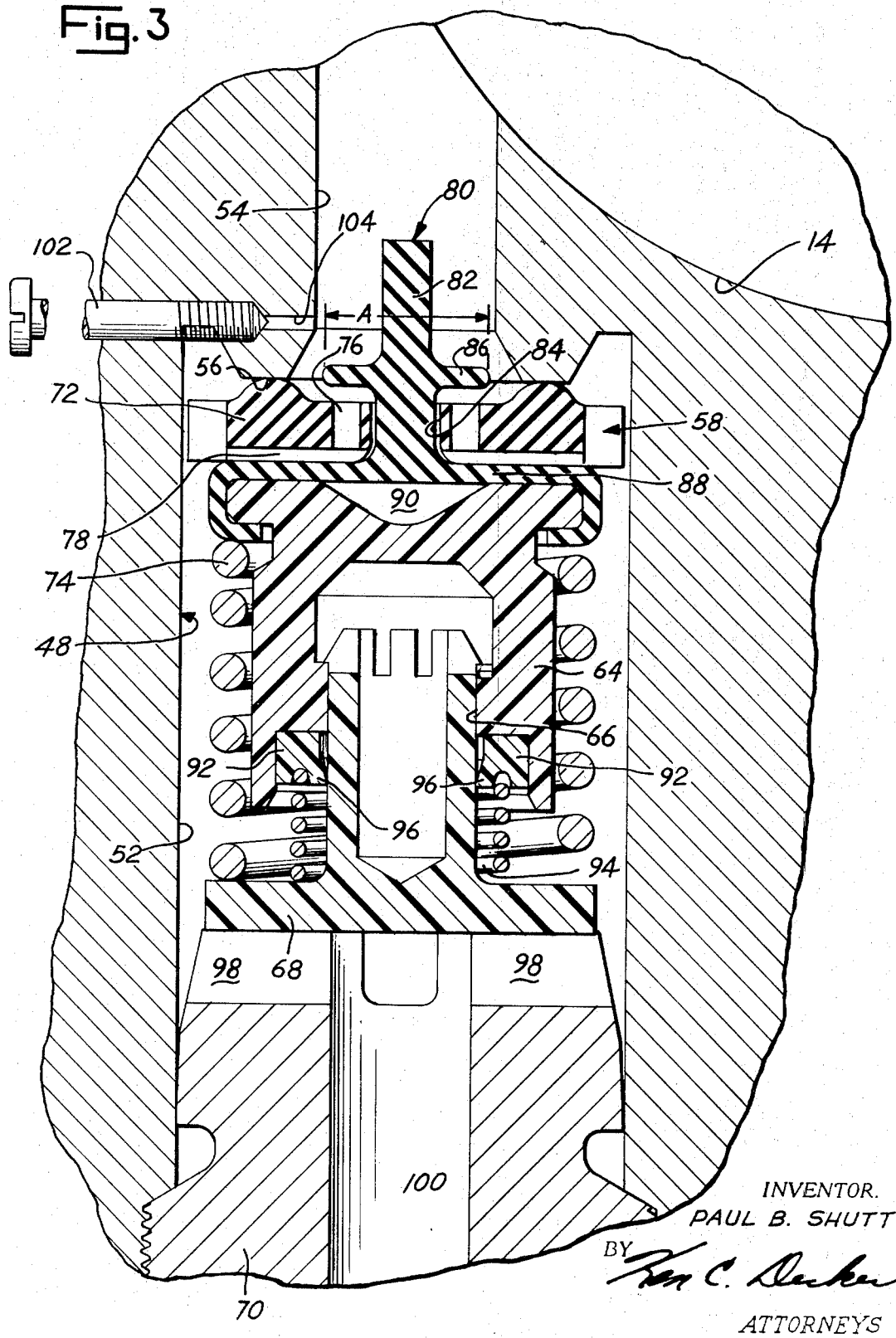

3,677,606

METERING VALVE

BACKGROUND OF THE INVENTION

This invention relates to a master cylinder which includes a metering valve in the outlet port thereof.

Many modern vehicles are provided with disc brakes on the front wheels and with drum brakes on the rear wheels. The force exerted by the return springs on the drum brakes must first be overcome before any braking force at all is exerted on the rear wheels, but the front disc brakes exert a braking force almost immediately after the vehicle operator depresses the brake pedal. For this reason, it has become customary to provide a metering valve in the front wheel brake lines that prevents the front brakes from exerting their full braking force until the force exerted by the return springs in the rear wheel brakes is overcome. However, all commercially available metering valves are mounted in a housing which must be attached to the vehicle separately from the other components of the braking system. The brake lines must be connected to the metering valve, which not only adds to the vehicle's cost but also increases the possibility that the brake lines will leak. Furthermore, upon a malfunction in the metering valve, many current valves remain closed at all times thereby rendering the front disc brakes inoperable.

SUMMARY OF THE INVENTION

Therefore, an important object of my invention is to provide a metering valve which is installed in the outlet passage of a standard master cylinder.

Another important object of my invention is to reduce the number of high pressure couplings required in an automotive braking system, thereby reducing the likelihood that the system will leak.

Another important object of my invention is to insure that some braking pressure will be supplied to the front wheel brakes, even if the metering valve malfunctions.

Still another important object of my invention is to provide a metering valve that does not require a vent to atmosphere.

DRAWING DESCRIPTION

FIG. 3 is an enlarged, cross-sectional view taken substantially along lines 3—3 of FIG. 1.

DETAILED DESCRIPTION

Figure 1:
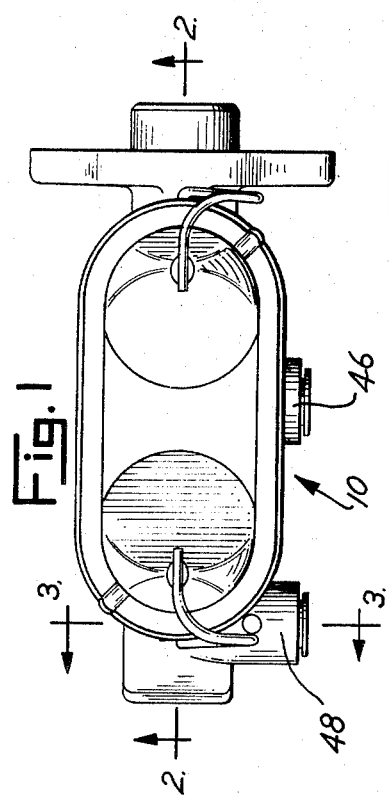
FIG. 1 is a top plan view of a master cylinder with a metering valve installed therein as made pursuant to the teachings of my present invention.
Figure 2:
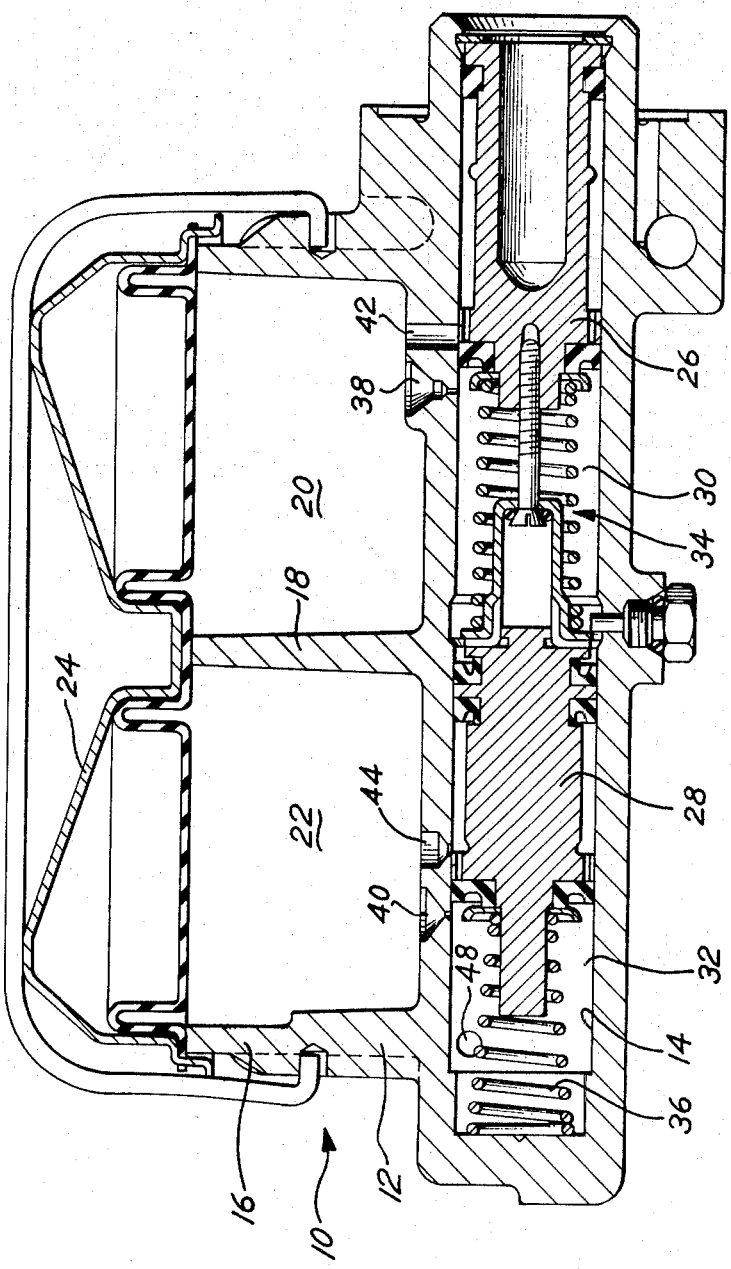
FIG. 2 is an enlarged, cross-sectional view taken substantially along lines 2—2 of FIG. 1.

Referring now to the drawings, a standard automotive master cylinder generally indicated at 10 includes a housing 12 defining a bore 14 therewithin. Housing 12 further includes an annular wall 16 and a partition 18 that defines a pair of fluid reservoirs 20 and 22 which are closed by a cover member 24. A primary piston 26 and a secondary piston 28 are slidably arranged in end-to-end relationship in the bore 14. A first fluid chamber 30 is defined between the pistons 26 and 28, and a second fluid chamber 32 is defined between the end of the secondary piston 28 and the end of the bore 14. A caged spring assembly 34 is disposed between the pistons 26 and 28, and another spring 36 is disposed between the end of the secondary piston 28 and the end of the bore 14. Compensating ports 38, 40 and fill ports 42, 44 communicate the reservoirs 20 and 22 with the fluid chambers 30 and 32, respectively. An outlet passage 46 communicates the chamber 30 and the rear wheel brakes of the vehicle, and another outlet passage 48 communicates the chamber 32 with the front wheel brakes of the vehicle. The piston 26 is operably connected to the usual brake pedal in the vehicle operator's compartment.

Referring now to FIG. 3, the outlet passage 48 is stepped to present a larger diameter portion 52 and a smaller diameter portion 54 that defines a shoulder 56 therebetween. Valve means generally indicated at 58 divide the passage 48 into an inlet chamber and an outlet chamber. An annular valve supporting member 64 defining an open-ended bore 66 therewithin is slidably supported in the passage 48 by a guide member 68 that is supported on one side of a tube seat 70 which serves the normal brake lines (not shown) to the master cylinder 10. The guide member 68 is slidably received within the bore 66 of the member 64 and slidably positions the latter within the passage 48.

A first valve member 72 is supported for sliding movement in the passage by the valve supporting member 64. A spring 74 yieldably urges the valve supporting member 64 toward the first valve member 72 and therefore, also urges the first valve member 72 into sealing engagement with the shoulder 56. The first valve member 72 is provided with a plurality of axially extending passages 76 therethrough that cooperate with radially extending grooves 78 in the lower surface of the valve member 72 to communicate fluid from the inlet to the outlet chambers. A second valve member 80 includes a stem 82 that extends through an axial opening 84 in the first valve member 72. Second valve member 80 includes a transversely extending portion 86 that projects from the member 80 on one side of the first valve member 72 and is adapted to close the passages 76 when the transversely extending portion 86 is forced into sealing engagement with the first valve member 72. A diaphragm 88 is secured to the stem 82 on the other side of the first valve member 72 and extends across a dish-like cavity 90 in the closed end of the valve supporting member 64.

A seal 92 is provided between the valve supporting member 64 and guide member 68 to prevent fluid from entering the bore 66. A spring 94 urges a lip 96 that extends from the seal 92 against the guide member 68. Transversely extending passages 98 and a longitudinally extending passage 100 are provided in the tube seat 70 to permit fluid communication between the portion 52 of the passage 48 and the front wheel brakes of the vehicle.

A bleed screw 102 is provided to enable fluid to flow directly from the inlet to the outlet chamber when the brake lines are initially filled with fluid. When the brake lines are bled, screw 102 is loosened to permit flow of fluid from the inlet chamber to the outlet chamber. After the bleeding procedure is completed, the screw 102 is tightened to prevent flow of fluid through the passage 104, thus assuring normal operation of the valve.

MODE OF OPERATION

When the brakes are released, the various components of the valve means 58 are disposed as illustrated in FIG. 3. When the vehicle operator applies the vehicle's brakes, fluid pressure is developed in the chamber 32 by movement of the piston 28 toward the closed end of the bore 14 and initially flows through the passages 76 and grooves 78 to the vehicle's brakes. When the pressure acting on the diaphragm 88 extending across the cavity 90 is forced against the walls of the cavity to force the transversely extending portion 86 into sealing engagement with the first valve member 72, fluid communication through the passages 76 and grooves 78 is terminated. When the pressure in the portion 54 of the passage 48 is increased to a second predetermined level sufficiently high to overcome the force of the spring 74, the first valve member 72 moves away from the shoulder 56 to permit fluid communication between the portions 52 and 54 of the passage 48 until the pressures in the inlet and outlet chambers are substantially equal. The force of the spring 74 then urges the first valve member 72 back into sealing engagement with the shoulder 56. When the pressure in the portion 54 of the passage 48 is incrementally increased, the valve opens, but again closes when the pressure in the ports 52 and 54 equalize. This metering action of the valve means 58 continues until the force due to fluid pressure acting on the area A exceeds the force of the spring 74. The valve means 58 then opens and remains open, preventing substantially uninhibited fluid communication between the chamber 32 and the front wheel disc brakes of the vehicle.

When the vehicle operator releases the brakes, the pressure level in the passage 48 is reduced until the force of spring 74 again urges the first valve member 72 into sealing engagement with the shoulder 56. As the pressure in the portion 54 of passage 48 is decreased still further, the higher pressure fluid in the portion 52 of passage 48 flows through the grooves 78 and passages 76 and acts against the side of the transversely extending portion 86. Since the latter is made of a resilient material, the pressure in the passage 76 deflects the latter to permit fluid communication through the passages. When the pressure is reduced by a sufficient amount, the resiliency of the diaphragm 88 returns the valve member 80 to the brake released position, as illustrated in the drawing.

When prior art metering valves malfunctioned, fluid communication through the valve was prevented. In the present device, however, the transversely extending portion 86 is flexible. Therefore, when the fluid pressure level in the portion 54 of passage 48 reaches a third level, which is substantially higher than the second fluid level, the transversely extending portion 86 deflects into the passages 76 to permit limited fluid communication through the latter. Therefore, the front wheel brakes are always at least partly operative.

Most conventional metering valves require a vent to the atmosphere. In the present design, air is retained in the cavity 90 and in the bore 66 which is compressed and relieved as the valve operates. Since the pressure of the brake fluid surrounding the members 72, 80 and 64 is much greater than the air contained in the bore 66 and cavity 90, and since the members 72, 80 and 64 are made of a resilient material, the high pressure on the exterior of these members prevents flow of fluid into the air-filled bore 66 and cavity 90 and prevents air from leaking therefrom to contaminate the brake fluid. No vent is required since the air is compressed and then relieved as the valve operates.

I claim:
1. In a fluid motor for use in a vehicle braking system:
a housing defining a bore therewithin;
pressurizing means for developing fluid pressure within said bore;
outlet passage means within said housing for communicating pressurized fluid from said bore, said outlet passage means being stepped to present larger and smaller diameter portions with a shoulder therebetween; and
valve means slidably mounted in said outlet passage means dividing the latter into an inlet chamber and an outlet chamber, said valve means including a first valve member yieldably urged into engagement with said shoulder and a second valve member yieldably urged away from said first valve member, said first valve member having passages extending therethrough to permit flow of fluid through said first valve member and an opening also extending therethrough, said second valve member engaging said first valve member to terminate fluid communication between the inlet and outlet chambers when the pressure in the inlet chamber reaches a first predetermined level, said second valve member having an elongated stem through said openings and a transversely extending section adapted to engage said first valve member to close said passages extending through the latter, said first valve member moving away from said shoulder to resume fluid communication between the inlet and outlet chambers when the pressure in the inlet chamber reaches a second predetermined level, said transversely extending section deflecting into said passages in said first valve member to permit a fluid communication between the inlet and outlet chambers when the pressure in said inlet chamber exceeds a third predetermined level higher than said second predetermined level and a malfunction prevents movement of said first valve member away from said shoulder.

2. In a fluid motor for use in a vehicle braking system:
a housing defining a bore therein;
pressurizing means for developing fluid pressure within said bore;
outlet passage means within said housing for communicating pressurized fluid from said bore, said outlet passage means being stepped to present larger and smaller diameter portions with a shoulder therebetween;
valve means slidably mounted in said outlet passage means dividing the latter into an inlet chamber and an outlet chamber, said valve means including a first valve member yieldably urged into engagement with said shoulder and a second valve member yieldably urged away from said first valve member;
a valve supporting member slidably mounted in said outlet chamber, said valve supporting member being operatively connected to said fist and second valve members;
a guide member supported in said outlet chamber, said valve supporting member defining an open-ended bore therewithin, said bore slidably receiving said guide member; and
resilient means within said outlet chamber yieldably urging said valve supporting member and said first valve member toward said shoulder, said second valve member engaging said first valve member to terminate fluid communication between the inlet and outlet chamber when the pressure in the inlet chamber reaches a first predetermined level, said first valve member moving away from said shoulder to resume fluid communication between the inlet and outlet chambers when the pressure in the inlet chamber reaches a second predetermined level.

3. The invention of claim 2:
said first valve member having passages to permit flow of fluid through the first valve member and an opening extending therethrough;
said valve supporting member having a cavity formed therein;
said second valve member including a stem extending through said opening, a transversely extending section on one side of said stem adapted to engage the first valve member to close said passages extending through the latter, and a diaphragm attached to the other end of the stem extending across said cavity and secured to said valve supporting member;
said diaphragm being forced against the wall of said cavity to force said transversely extending portion against said first valve member when the pressure in said inlet chamber reaches said first level.

4. The invention of claim 2:
said valve supporting member having a cavity formed in one end thereof;
said second valve member having a diaphragm secured thereto, said diaphragm extending across said cavity and being secured to said valve supporting member;
said diaphragm being forced against the wall of said cavity to force said second valve member against said first valve member when the pressure in said inlet chamber reaches said first level.

5. The invention of claim 2:
said valve supporting member having a cavity formed in one end thereof;
said second valve member having a diaphragm secured thereto, said diaphragm extending across said cavity and being secured to said valve supporting member;
said diaphragm being forced against the wall of said cavity to force said second valve member against said first valve member when the pressure in said inlet chamber reaches said first level.

6. The invention of claim 2:
said first valve member having passages to permit flow of fluid through the first valve member;
said second valve membering having an elongated stem extending through said openings and a transversely extending section adapted to engage said first valve member to close said passages extending through the latter;

said transversely extending section deflecting into said passages in said first valve member to permit fluid communication between said inlet and outlet chambers when the pressure in said inlet chamber exceeds a third predetermined level higher than said second predetermined level and a malfunction prevents movement of said first valve member away from said shoulder.

7. In a master cylinder which supplies pressurized fluid through a first outlet to disc wheel brakes and a second outlet to drum wheel brakes in a braking system, metering means for controlling the pressurized fluid flow to synchronize the actuation of the disc and drum wheel brakes, said metering means comprising:

a housing located in said first outlet going to the disc brakes having an internal bore which is stepped to provide larger and smaller diameter portions with a shoulder therebetween;

valve means slidably mounted in the larger diameter portion of said bore for dividing the bore into an inlet section and an outlet section, said valve means having a first valve member yieldably urged into engagement with said shoulder and a second valve member yieldably urged away from said first valve member;

a valve supporting member slidably mounted in said outlet section, said valve supporting member being operatively connected to said first and second valve members;

a guide member located in said outlet section, said valve supporting member having an open-ended passage therein for slidably receiving said guide member; and resilient means located in said outlet section for urging said valve support member and said first valve member toward said shoulder, said second valve member engaging said first valve member to terminate fluid flow between the inlet and outlet sections when the pressure in the inlet chamber reaches a first predetermined level, said first valve member moving away from said shoulder to allow pressurized fluid communication between the inlet and outlet sections to the disc brakes when the pressure in the inlet chamber reaches a second predetermined level when the drum brakes are engaged.

* * * * *